United States Patent [19]

Legault

[11] Patent Number: 5,064,222
[45] Date of Patent: Nov. 12, 1991

[54] BAR CODE APPLICATOR

[75] Inventor: Jean-Marc Legault, Aylmer, Canada

[73] Assignee: Canada Post Corp., Ontario, Canada

[21] Appl. No.: 439,279

[22] Filed: Nov. 20, 1989

[51] Int. Cl.$^5$ .............................................. G09F 03/00
[52] U.S. Cl. ..................................... 283/71; 281/15.1; 428/343; 428/914
[58] Field of Search ..................... 281/15.1, 16, 38, 40; 283/71; 428/343, 914, 915; 235/488

[56] References Cited

U.S. PATENT DOCUMENTS

| | | | |
|---|---|---|---|
| 306,674 | 10/1884 | Cooke | 281/15.1 |
| 1,790,033 | 1/1931 | Voelcker | 281/16 |
| 4,570,416 | 2/1986 | Shoenfeld | 283/79 |

Primary Examiner—Mark Rosenbaum
Assistant Examiner—Allan M. Schrock
Attorney, Agent, or Firm—Lorusso & Loud

[57] ABSTRACT

A bar code applicator is provided, which may be incorporated into a booklet, comprised of a translucent sheet having on one side thereof pressure-transferrable figures comprising an array of bars, the bars adapted to be transferred by the user to the face of an envelope or the like in a predesignated position to designate individual letters or numbers, to be read by an optical character reader. There is further provided a booklet incorporating the applicator, having also one or more groups of sheets, each group comprising an instruction page, a bar code applicator and a separator sheet adjacent the bar code applicator.

7 Claims, 2 Drawing Sheets

BAR CODE APPLICATOR

The present invention relates to a device for applying a bar code to the face of an envelope or the like, the bars of the bar code being positioned to designate individual letters or numbers of a postal code or zip code and readable by an optical character reader ("OCR").

Modern postal systems frequently make use of a bar code system for routing mail, wherein a bar code is applied to the face of an envelope or package, designating a particular postal code or zip code. When the envelope or package is processed within the Post Office, the bar code is read by an optical character reader, which relays the information to equipment that automatically routes mail to the appropriate location. A typical bar code consists of a series of black bars positioned to designate particular letters or numbers, depending on the postal code system in use in the particular country. Bar codes of this type are commonly preprinted on envelopes by businesses such as utilities or credit card companies, wherein the customer is supplied with an envelope to be returned to the business.

A limitation of the use of bar codes for routing mail is that the bars must be precisely positioned on the envelope and be of consistent size and shape and sufficient opacity in order to be properly read by the optical character reader. Precise positioning is required because of the speed with which mail is handled in modern postal systems. This requirement for accuracy has presented problems where it is desired to have individual consumers apply a bar code to the face of an envelope. Known methods such as stencils are inadequate, as are envelopes having squares that may be filled in by the customers. Both such devices lead to significant inaccuracies in the placement of the individual bars, as well as their opacity and shape. It is further desirable to supply a means for applying bar codes to envelopes in a convenient package that combines a bar code applicator with instructions and postage stamps.

Accordingly, the present invention is a bar code applicator comprising a sheet having on one side thereof an array of pressure-transferrable figures comprising an array of bars of generally consistent size and opacity, said bars adapted to be transferred to a document, positioned to designate individual letters or numbers, and there to be read by an OCR. In a preferred embodiment, the bar code applicator is provided within a booklet comprising repeating sequences of sheets, each sequence comprising an instruction page, a self-stick adhesive stamp, a bar code applicator, and a separator sheet adjacent said bar code applicator.

The invention will now be described by way of the preferred embodiment wherein.

Figure 1:
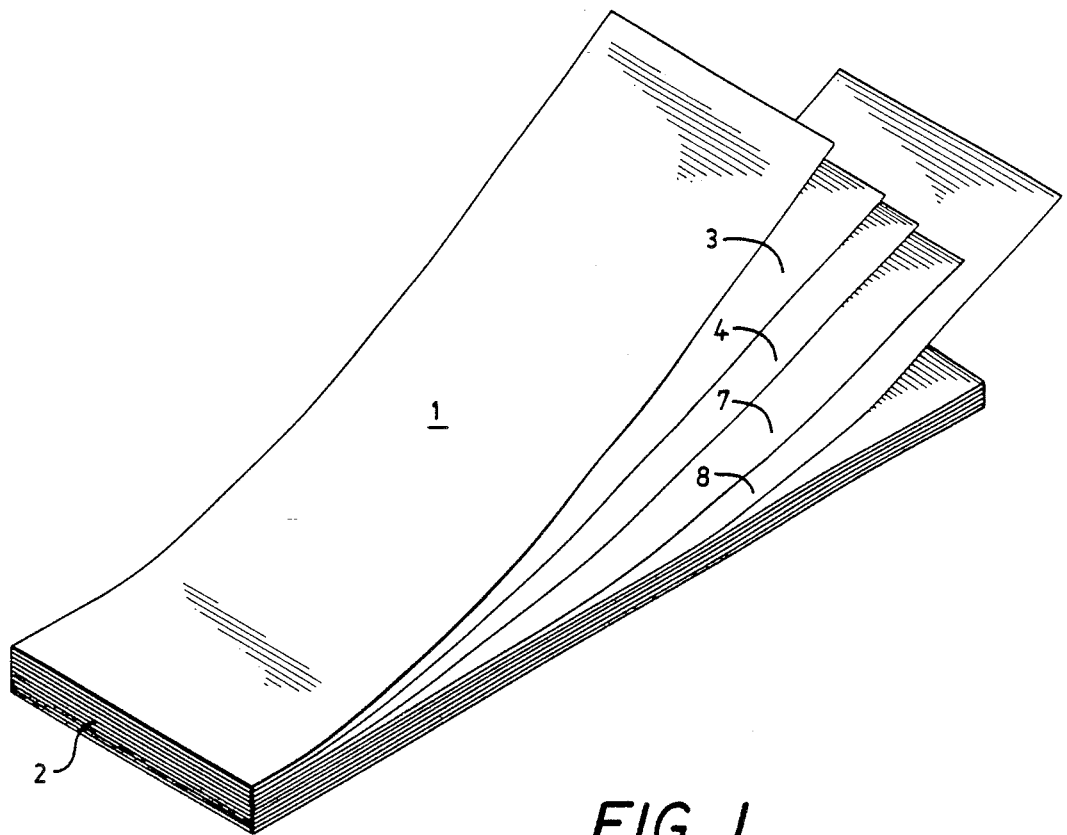
FIG. 1 is a perspective view of a booklet according to the present invention.

Referring to FIG. 1, a booklet is provided having a cover 1 and spine 2. The cover 1 is preferably a thin flexible cardboard sheet, and the spine 2 comprises a glue layer that allows the sheets of the booklet to be readily removed.

Figure 2:
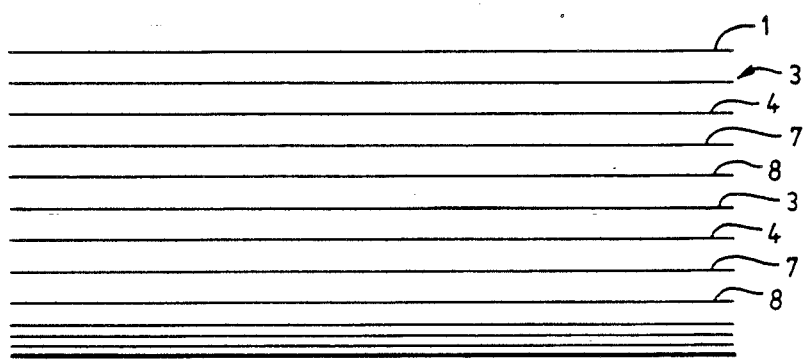
FIG. 2 is a schematic exploded side view of the present invention.
Figure 3:
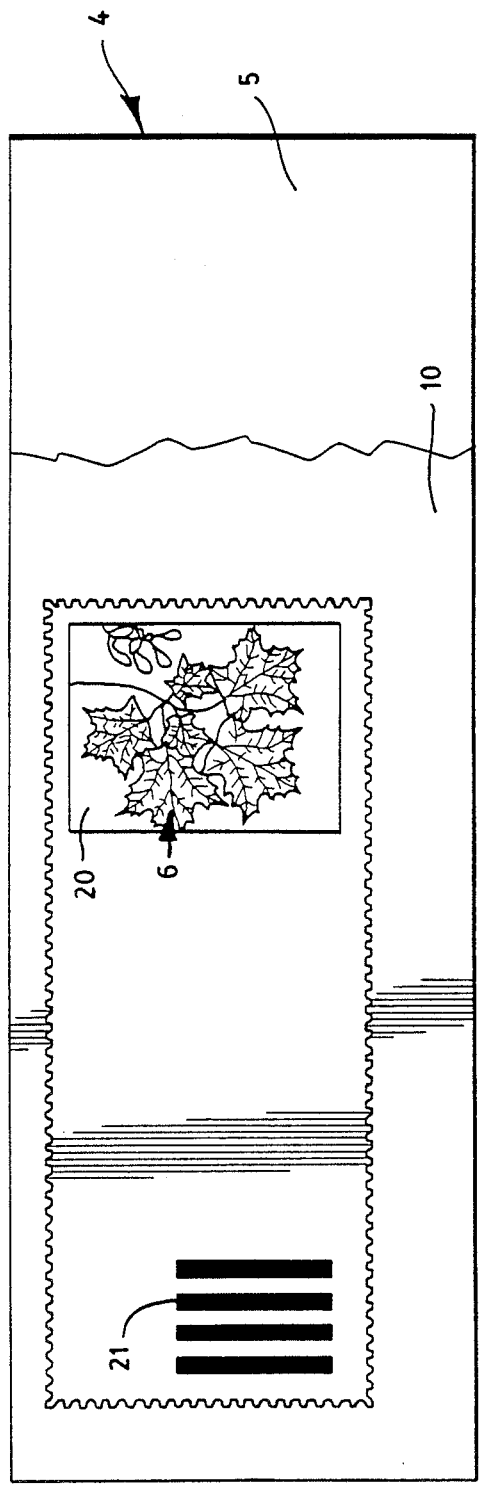
FIG. 3 is a plan view of a stamp page, illustrating the release layer partly removed.

Referring to FIG. 2, the pages of the booklet comprise repeating groups of sheets, each group consisting of the following:

(a) a protective cover sheet 3, comprised of coloured tissue paper;

(b) a stamp page 4, illustrated in FIG. 3, comprised of a release sheet 5 having a release layer coating 10 on the upper surface thereof, and having a self-stick adhesive stamp sheet 6 releasably engaged thereto. In use, the user peels off the stamp 6 from the stamp page 4, and adheres it to the envelope by applying pressure to the stamp;

(c) an instruction sheet 7, instructing the user in the method of use set out herein;

(d) a bar code applicator 8.

Referring to FIG. 3, the stamp sheet 6 is comprised of a self-stick adhesive sheet having printed thereon a postage stamp 20 and a set of extraction bars 21. The extraction bars, which are adapted to be read by an OCR, signal the latter that the letter has an OCR-readable postal code applied thereto. The letter may then be routed into the appropriate stream for further, automatic processing.

Figure 4:
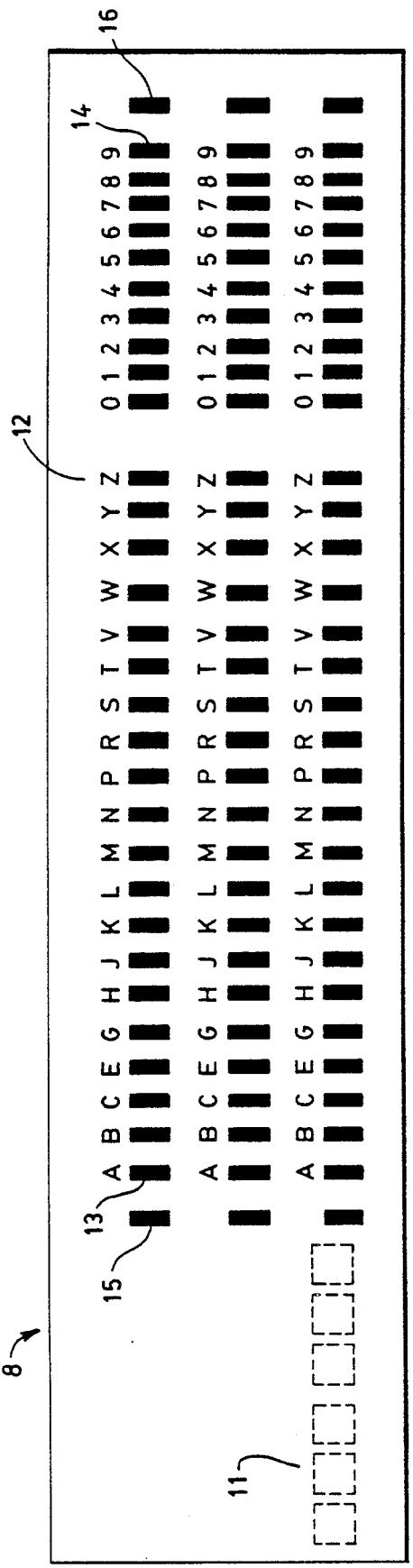
FIG. 4 is a plan view of a bar code applicator, the inked surface thereof facing away from the viewer.

The bar code applicator 8, more fully illustrated in FIG. 4, is comprised of a flexible clear or translucent plastic sheet, having Letraset (Tm) pressure sensitive figures on one face thereof. The figures are visible through the sheet. In the embodiment illustrated herein, the bar code applicator is adapted to allow the user to apply a precise and uniform bar code designating a Canadian postal code, consisting of a six figure alphanumeric code, to the face of an envelope. The applicator may be adapted to apply any appropriate postal code for other countries. The figures illustrated in FIG. 4 comprise a longitudinal array 11 of six adjacent boxes, and an array 12 of short bars. The array of bars comprises three rows 13 of 24 bars, arranged in a column, adjacent three rows 14 of 10 bars arranged in a column. Adjacent each row 13 and 14, and spaced apart therefrom, are individual start read bars 15 and stop read bars 16, which signal the OCR to start and stop reading respectively. The letters of the alphabet are positioned above each row of 24 bars, and the numbers 0 through 9 are positioned above each row of 10 bars. All letters and numbers are printed to be read through the sheet, with the inked surface facing away from the user. The bars are of uniform size and a uniform shade and opacity of black, and all other figures are in red, the latter being of a shade that is not detected by an OCR.

In use, the bar code applicator is used to apply an array of boxes 11 wherein a postal code may be hand written or typed, and a corresponding bar code to the face of an envelope or package. The user aligns the bottom right hand corner of the envelope with the bottom right hand corner of the applicator, and the bottom and right edges of the envelope with the corresponding edges of the applicator. The applicator is positioned such that the pressure-sensitive figures are facing down, towards the envelope. With a pen or the like, the boxes are rubbed off onto the envelope. The user then rubs off appropriate bars designating the desired postal code, as well as the OCR start and stop reading bars, and then writes in the postal code within the boxes. The user then applies the stamp sheet to the envelope in the appropriate location. The resulting envelope may then be read first by a preliminary detector that detects the extraction bars and then the OCR that detects the postal code.

The booklet is arranged so that each group of sheets is intended to be utilized for a single letter, and is separated by readily-visible separator sheets. Thus each stamp sheet, instruction sheet and applicator are utilized for an individual envelope.

While the invention has been described by way of a particular embodiment, it is not intended to be limited thereto; various modifications may be made thereto, and various components of the booklet may be used in isolation, without departing from the spirit and scope of the invention as defined in the appended claims.

The embodiments of the invention in which an exclusive property or privilege is claimed are defined as follows:

1. A bar code applicator comprising a translucent sheet having on one side thereon an array of pressure-transferrable figures comprising an array of bars of even shape and opacity positioned to designate individual letters or numbers, said bars being adapted to be transferred to an envelope or package and there read by an optical character reader.

2. An applicator as claimed in claim 1 wherein said bars are positioned to designate an alphanumeric code.

3. A booklet comprising at least one group of sheets, said group comprising a cover sheet, an instruction page and a bar code applicator, said bar code applicator comprising a translucent or transparent sheet having a bottom edge and a side edge defining a right-angled corner, said translucent or transparent sheet having a first side and a second side, said first side having an array of pressure-transferrable opaque bars positioned with respect to said corner to designate a plurality of letters and numbers, said bars being transferable to an envelope in positions for reading by an optical character reader by placing said first side of said translucent or transparent sheet on an envelope with said corner aligned with a corner of said envelope and rubbing said second side of said translucent or transparent sheet at positions of bars corresponding to a postal code to be applied to said envelope.

4. A booklet as claimed in claim 3 having a multiplicity of said groups.

5. A booklet as claimed in claim 3 wherein there is further provided in said group a stamp page having a release coating on one side thereof, to which is releasably engaged a self-stick adhesive stamp.

6. A bar code applicator comprising a translucent or transparent sheet having a bottom edge and a side edge defining a right-angled corner, said translucent or transparent sheet having a first side and a second side, said first side having an array of pressure-transferrable opaque bars positioned with respect to said corner to designate a plurality of letters and numbers, said bars being transferable to an envelope in positions for reading by an optical character reader by placing said first side of said translucent or transparent sheet on an envelope with said corner aligned with a corner of said envelope and rubbing said second side of said translucent or transparent sheet at positioned of bars corresponding to a postal code to be applied to said envelope.

7. The bar code applicator of claim 6 wherein said bars are positioned to designate an alphanumeric code.

* * * * *